US008400450B2

(12) United States Patent
Lantin

(10) Patent No.: US 8,400,450 B2
(45) Date of Patent: **\*Mar. 19, 2013**

(54) METHOD AND SYSTEM FOR DISPLAYING STEREOSCOPIC DETAIL-IN-CONTEXT PRESENTATIONS

(75) Inventor: Maria Lantin, Vancouver (CA)

(73) Assignee: Noregin Assets, N.V., L.L.C., Dover, DE (US)

( \* ) Notice: Subject to any disclaimer, the term of this patent is extended or adjusted under 35 U.S.C. 154(b) by 125 days.

This patent is subject to a terminal disclaimer.

(21) Appl. No.: 12/764,724

(22) Filed: Apr. 21, 2010

(65) Prior Publication Data

US 2010/0201785 A1 Aug. 12, 2010

Related U.S. Application Data

(63) Continuation of application No. 11/410,024, filed on Apr. 25, 2006, now Pat. No. 7,737,976, which is a continuation of application No. 10/289,453, filed on Nov. 7, 2002, now Pat. No. 7,088,364.

(30) Foreign Application Priority Data

Nov. 7, 2001 (CA) ..................................... 2361341

(51) Int. Cl.
G06T 15/20 (2011.01)
G06T 15/10 (2011.01)
G06T 15/00 (2011.01)
(52) U.S. Cl. ........................................ 345/427; 345/419
(58) Field of Classification Search .................. None
See application file for complete search history.

(56) References Cited

U.S. PATENT DOCUMENTS

| 3,201,546 A | 8/1965 | Richardson |
| 3,704,938 A | 12/1972 | Fanselow |
| 3,739,739 A | 6/1973 | Brase |
| 3,762,799 A | 10/1973 | Shapiro |
| 4,581,647 A | 4/1986 | Vye |
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |

(Continued)

FOREIGN PATENT DOCUMENTS

| CA | 2350342 | 11/2002 |
| CA | 2386560 | 11/2003 |

(Continued)

OTHER PUBLICATIONS

Gain, J. E. 2000. Enhancing Spatial Deformation for Virtual Sculpting. PhD thesis, St. Johns College, University of Cambridge. Chapter 3, End Portion of chapter 6, and chapter 8.*

(Continued)

*Primary Examiner* — Daniel Hajnik
(74) *Attorney, Agent, or Firm* — McAndrews, Held & Malloy, Ltd.

(57) ABSTRACT

A method for generating a stereoscopic presentation of a region-of-interest in a monoscopic information representation. The method includes the steps of: (a) selecting first and second viewpoints for the region-of-interest; (b) creating a lens surface having a predetermined lens surface shape for the region-of-interest, the lens surface having a plurality of polygonal surfaces constructed from a plurality of points sampled from the lens surface shape; (c) creating first and second transformed presentations by overlaying the representation on the lens surface and perspectively projecting the lens surface with the overlaid representation onto a plane spaced from the first and second viewpoints, respectively; and, (d) displaying the first and second transformed presentations on a display screen to generate the stereoscopic presentation.

18 Claims, 6 Drawing Sheets

U.S. PATENT DOCUMENTS

| | | | |
|---|---|---|---|
| 4,800,379 A | 1/1989 | Yeomans | |
| 4,885,702 A | 12/1989 | Ohba | |
| 4,888,713 A | 12/1989 | Falk | |
| 4,970,028 A | 11/1990 | Kenyon et al. | |
| 4,985,849 A | 1/1991 | Hideaki | |
| 4,992,866 A | 2/1991 | Morgan | |
| 5,026,151 A * | 6/1991 | Waltuck et al. | 351/246 |
| 5,031,918 A | 7/1991 | Brill | |
| 5,048,077 A | 9/1991 | Wells et al. | |
| 5,175,808 A | 12/1992 | Sayre | |
| 5,185,599 A | 2/1993 | Dorrnink et al. | |
| 5,185,667 A | 2/1993 | Zimmerman | |
| 5,200,818 A | 4/1993 | Neta et al. | |
| 5,206,721 A | 4/1993 | Ashida et al. | |
| 5,227,771 A | 7/1993 | Kerr et al. | |
| 5,250,934 A | 10/1993 | Denber et al. | |
| 5,258,837 A | 11/1993 | Gormley | |
| 5,269,687 A | 12/1993 | Mott et al. | |
| 5,275,019 A | 1/1994 | Pagani | |
| 5,309,279 A | 5/1994 | Halstead | |
| 5,321,807 A | 6/1994 | Mumford | |
| 5,329,310 A | 7/1994 | Liljegren et al. | |
| 5,341,466 A | 8/1994 | Perlin et al. | |
| 5,369,527 A | 11/1994 | McCracken | |
| 5,416,900 A | 5/1995 | Blanchard et al. | |
| 5,432,895 A | 7/1995 | Myers | |
| 5,451,998 A | 9/1995 | Hamrick | |
| 5,459,488 A | 10/1995 | Geiser | |
| 5,473,740 A | 12/1995 | Kasson | |
| 5,504,845 A * | 4/1996 | Vecchione | 345/419 |
| 5,521,634 A | 5/1996 | McGary | |
| 5,523,783 A | 6/1996 | Cho | |
| 5,528,289 A | 6/1996 | Cortjens et al. | |
| 5,539,534 A | 7/1996 | Hino et al. | |
| 5,581,670 A | 12/1996 | Bier et al. | |
| 5,583,977 A | 12/1996 | Seidl | |
| 5,588,098 A | 12/1996 | Chen et al. | |
| 5,594,859 A | 1/1997 | Palmer et al. | |
| 5,596,690 A | 1/1997 | Stone et al. | |
| 5,598,297 A | 1/1997 | Yamanaka et al. | |
| 5,610,653 A | 3/1997 | Abecassis | |
| 5,613,032 A | 3/1997 | Cruz et al. | |
| 5,638,523 A | 6/1997 | Mullet et al. | |
| 5,644,758 A | 7/1997 | Patrick | |
| 5,651,107 A | 7/1997 | Frank et al. | |
| 5,652,851 A | 7/1997 | Stone et al. | |
| 5,657,246 A | 8/1997 | Hogan et al. | |
| 5,670,984 A | 9/1997 | Robertson et al. | |
| 5,680,524 A | 10/1997 | Maples et al. | |
| 5,682,489 A | 10/1997 | Harrow et al. | |
| 5,689,287 A | 11/1997 | Mackinlay et al. | |
| 5,689,628 A | 11/1997 | Robertson | |
| 5,721,853 A | 2/1998 | Smith | |
| 5,726,704 A * | 3/1998 | Uomori | 348/47 |
| 5,729,673 A | 3/1998 | Cooper et al. | |
| 5,731,805 A | 3/1998 | Tognazzini et al. | |
| 5,742,272 A | 4/1998 | Kitamura et al. | |
| 5,745,166 A | 4/1998 | Rhodes et al. | |
| 5,751,289 A | 5/1998 | Myers | |
| 5,754,348 A | 5/1998 | Soohoo | |
| 5,764,139 A | 6/1998 | Nojima et al. | |
| 5,786,814 A | 7/1998 | Moran et al. | |
| 5,798,752 A | 8/1998 | Buxton et al. | |
| 5,808,670 A | 9/1998 | Oyashiki et al. | |
| 5,812,111 A | 9/1998 | Fuji et al. | |
| 5,818,455 A | 10/1998 | Stone et al. | |
| 5,848,231 A | 12/1998 | Teitelbaum et al. | |
| 5,852,440 A | 12/1998 | Grossman et al. | |
| 5,872,922 A | 2/1999 | Hogan et al. | |
| 5,909,219 A | 6/1999 | Dye | |
| 5,923,364 A | 7/1999 | Rhodes et al. | |
| 5,926,209 A | 7/1999 | Glatt | |
| 5,949,430 A | 9/1999 | Robertson et al. | |
| 5,950,216 A | 9/1999 | Amro et al. | |
| 5,959,605 A | 9/1999 | Gilblom | |
| 5,969,706 A | 10/1999 | Tanimoto et al. | |
| 5,973,694 A | 10/1999 | Steele et al. | |
| 5,991,877 A | 11/1999 | Luckenbaugh | |
| 5,999,879 A | 12/1999 | Yano | |
| 6,005,611 A | 12/1999 | Gullichsen et al. | |
| 6,037,939 A | 3/2000 | Kashiwagi et al. | |
| 6,052,110 A | 4/2000 | Sciammarella et al. | |
| 6,057,844 A | 5/2000 | Strauss | |
| 6,064,401 A | 5/2000 | Holzman et al. | |
| 6,067,372 A | 5/2000 | Gur et al. | |
| 6,069,634 A * | 5/2000 | Gibson | 345/424 |
| 6,072,501 A | 6/2000 | Bier | |
| 6,073,036 A | 6/2000 | Heikkinen et al. | |
| 6,075,531 A | 6/2000 | DeStefano | |
| 6,081,277 A | 6/2000 | Kojima | |
| 6,084,598 A | 7/2000 | Chekerylla | |
| 6,091,771 A | 7/2000 | Seeley et al. | |
| 6,108,005 A | 8/2000 | Starks et al. | |
| 6,128,024 A | 10/2000 | Carver et al. | |
| 6,133,914 A | 10/2000 | Rogers et al. | |
| 6,147,709 A | 11/2000 | Martin et al. | |
| 6,154,840 A | 11/2000 | Pebly et al. | |
| 6,160,553 A | 12/2000 | Robertson et al. | |
| 6,184,859 B1 | 2/2001 | Kojima | |
| 6,198,484 B1 | 3/2001 | Kameyama | |
| 6,201,546 B1 | 3/2001 | Bodor et al. | |
| 6,201,548 B1 | 3/2001 | Cariffe et al. | |
| 6,204,845 B1 | 3/2001 | Bates et al. | |
| 6,204,850 B1 | 3/2001 | Green | |
| 6,215,491 B1 | 4/2001 | Gould | |
| 6,219,052 B1 | 4/2001 | Gould | |
| 6,241,609 B1 | 6/2001 | Rutgers | |
| 6,246,411 B1 | 6/2001 | Strauss | |
| 6,249,281 B1 | 6/2001 | Chen et al. | |
| 6,256,043 B1 | 7/2001 | Aho et al. | |
| 6,256,115 B1 | 7/2001 | Adler et al. | |
| 6,256,737 B1 | 7/2001 | Bianco et al. | |
| 6,266,082 B1 | 7/2001 | Yonezawa et al. | |
| 6,271,854 B1 | 8/2001 | Light | |
| 6,278,443 B1 | 8/2001 | Amro et al. | |
| 6,278,450 B1 | 8/2001 | Arcuri et al. | |
| 6,288,702 B1 | 9/2001 | Tachibana et al. | |
| 6,304,271 B1 | 10/2001 | Nehme | |
| 6,307,612 B1 | 10/2001 | Smith et al. | |
| 6,320,599 B1 | 11/2001 | Sciammarella et al. | |
| 6,337,709 B1 | 1/2002 | Yamaashi et al. | |
| 6,346,938 B1 | 2/2002 | Chan et al. | |
| 6,346,962 B1 | 2/2002 | Goodridge | |
| 6,359,615 B1 | 3/2002 | Singh | |
| 6,381,583 B1 | 4/2002 | Kenney | |
| 6,384,849 B1 | 5/2002 | Morcos et al. | |
| 6,392,661 B1 | 5/2002 | Tankersley | |
| 6,396,648 B1 | 5/2002 | Yamamoto et al. | |
| 6,396,962 B1 | 5/2002 | Haffey et al. | |
| 6,400,848 B1 | 6/2002 | Gallagher | |
| 6,407,747 B1 | 6/2002 | Chui et al. | |
| 6,411,274 B2 | 6/2002 | Watanabe et al. | |
| 6,416,186 B1 | 7/2002 | Nakamura | |
| 6,417,867 B1 | 7/2002 | Hallberg | |
| 6,438,576 B1 | 8/2002 | Huang et al. | |
| 6,487,497 B2 | 11/2002 | Khavakh et al. | |
| 6,491,585 B1 | 12/2002 | Miyamoto et al. | |
| 6,504,535 B1 | 1/2003 | Edmark | |
| 6,515,663 B1 * | 2/2003 | Hung et al. | 345/427 |
| 6,515,678 B1 | 2/2003 | Boger | |
| 6,522,341 B1 | 2/2003 | Nagata | |
| 6,523,024 B1 | 2/2003 | Yajima et al. | |
| 6,542,191 B1 | 4/2003 | Yonezawa | |
| 6,549,650 B1 * | 4/2003 | Ishikawa et al. | 382/154 |
| 6,552,737 B1 | 4/2003 | Tanaka et al. | |
| 6,559,813 B1 | 5/2003 | DeLuca et al. | |
| 6,577,311 B1 | 6/2003 | Crosby et al. | |
| 6,577,319 B1 | 6/2003 | Kashiwagi et al. | |
| 6,584,237 B1 | 6/2003 | Abe | |
| 6,590,568 B1 | 7/2003 | Astala et al. | |
| 6,590,573 B1 * | 7/2003 | Geshwind | 345/419 |
| 6,590,583 B2 | 7/2003 | Soohoo | |
| 6,608,631 B1 | 8/2003 | Milliron | |
| 6,612,930 B2 | 9/2003 | Kawagoe et al. | |
| 6,631,205 B1 | 10/2003 | Melen et al. | |
| 6,633,305 B1 | 10/2003 | Sarfield | |
| 6,690,387 B2 | 2/2004 | Zimmerman et al. | |

| | | |
|---|---|---|
| 6,704,034 B1 | 3/2004 | Rodriguez et al. |
| 6,717,586 B2 * | 4/2004 | Fujiki .......................... 345/629 |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen et al. |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |
| 2009/0265656 A1 | 10/2009 | Jetha |
| 2009/0284542 A1 | 11/2009 | Baar |
| 2010/0026718 A1 | 2/2010 | Jetha |
| 2010/0033503 A1 | 2/2010 | Baar |
| 2010/0045702 A1 | 2/2010 | Doyle |
| 2010/0208968 A1 | 8/2010 | Shoemaker et al. |
| 2010/0262907 A1 | 10/2010 | Shoemaker et al. |

FOREIGN PATENT DOCUMENTS

| | | |
|---|---|---|
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

Fuhrmann et al. 1998. Real-time techniques for 3D flow visualization. In Proceedings of the conference on Visualization '98 (VIS '98). IEEE Computer Society Press, Los Alamitos, CA, USA, 305-312.*

"Non Final Office Action", U.S. Appl. No. 12/368,263, (Apr. 30, 2010), 8 pages.

"Non Final Office Action", U.S. Appl. No. 12/368,267, (Jun. 11, 2010), 12 pages.

"Notice of Allowability", U.S. Appl. No. 12/364,450, (Jun. 18, 2010), 2 pages.

"Non Final Office Action", U.S. Appl. No. 12/388,437, (Jun. 23, 2010), 7 pages.

"Non Final Office Action", U.S. Appl. No. 11/673,038, (Jul. 22, 2010), 39 pages.

"Final Office Action", U.S. Appl. No. 11/691,686, (Sep. 1, 2010), 16 pages.

"Non Final Office Action", U.S. Appl. No. 11/138,979, (Sep. 17, 2010), 11 pages.

"Non Final Office Action", U.S. Appl. No. 11/541,778, (Sep. 29, 2010), 10 pages.

"Final Office Action", U.S. Appl. No. 11/691,686, (Nov. 22, 2010), 16 pages.

"Non Final Office Action", U.S. Appl. No. 11/695,104, (Oct. 1, 2010), 9 pages.

"Final Office Action", U.S. Appl. No. 11/159,205, (Oct. 6, 2010), 16 pages.

"Non Final Office Action", U.S. Appl. No. 11/236,694, (Oct. 13, 2010), 16 pages.

Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", International Conference on Computer Graphics and Interactive Techniques. *Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96* Vancouver, BC Canada, (1996), pp. 383-390.

"Final Office Action", U.S. Appl. No. 12/368,263, (Nov. 5, 2010), 7 pages.

Carpendale, M. Sheelagh T., "A Framework for Elastic Presentation Space", *Simon Fraser University*, Burnaby; British Columbia XP001051168; cited in the application figures 2.13, 3.1-3.31, 4.1-4.19, 5.14,(Mar. 1999),pp. 7, 14, 34, 38, 65, 112, 123, and 126.

"Non Final Office Action", U.S. Appl. No. 11/935,222, (Feb. 20, 2009),8 pages.

Carpendale, M. Sheelagh T., et al., "A Framework for Unifying Presentation Space", *Proceedings of UIST '01: ACM Symposium on User Interface Software and Technology*, Orlando, FL, USA; XP002249323 2001, New York, NY, USA, ISBN: 1-58113-438-X,(Nov. 14, 2001),pp. 61-70, 64.

Ikedo, Tsuneo "A Realtime Video-Image Mapping Using Polygon Rendering Techniques", IEEE Intl. conf on Ottawa, ONT, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings,(Jun. 3, 1997),pp. 127-134.

Bouju, Alain et al., "Client-Server Architecture for Accessing Multimedia and Geographic Databases within Embedded Systems", Database and Expert Systems Applications, *1999 Proceedings*. Tenth International Workshop on Florence, Italy Sep. 1-3, 1999, Los Alamitos, CA, USA, IEEE Comput. Soc, US, XP010352370; ISBN:0-7695-0281-4, abstract, figure 2,(Sep. 1-3, 1999),pp. 760-764.

Robertson, George G., et al., "The Document Lens", *UIST. Proceedings of the Annual ACM Symposium on User Interface Software and Technology*, abstract figures 3,4,(Nov. 3, 1993),pp. 101-108.

Dursteler, Juan C., "The Digital Magazine of InfoVis.net", Retrieved from: <http://www.infovis.net/printMag.php?num=85&lang=2> on Nov. 9, 2006, (Apr. 22, 2002),2 pages.

"Presentation for CGDI Workshop", Retrieved from: http://www.geoconnections.org/developersCorner/devCorner_devNetwork/meetings/2002.05.30/IDELIX_CGDI_20020530_dist.pdf, (May 2002), 19 pages.

Kuederle, Oliver "Presentation of Image Sequences: A Detail-in-context Approach", *Thesis*, Simon Fraser University; (Aug. 2000),pp. 1-3, 5-10, 29-31.

Microsoft Corp., "Microsoft Paint", (1981-1998),pp. 1-14.

"Electronic Magnifying Glasses", *IBM Technical Disclosure Bulletin*, IBM Corp., New York, US, vol. 37, No. 3; XP000441501, ISSN: 0018-8689 the whole document; (Mar. 1, 1994),pp. 353-354.

Keahey, T. A., "The Generalized Detail-In-Context Problem", *Information Visualization 1998*, Proceedings; IEEE Symposium on Research Triangle, CA, USA; Los Alamitos, CA, USA, IEEE Comput. Soc, US; XP010313304; ISBN: 0-8186-9093,(Oct. 1998),pp. 44-51, 152.

Carpendale, M. Sheelagh T., et al., "3-Dimensional Pliable Surfaces: For the Effective Presentation of Visual Information", *Proceedings of the 8th annual ACM symposium on User interface and software technology*; (Nov. 14-17, 1995),pp. 217-226.

Carpendale, M. Sheelagh T., et al., "Extending Distortion Viewing from 2D to 3D", *IEEE Computer Graphics and Applications*, IEEE Inc. New York, US, vol. 17, No. 4; XP000927815, ISSN: 0272-1716. (Jul. 1997),pp. 42-51.

Viega, J et al., "3D magic lenses", *Proceedings of the 9th annual ACM symposium on User interface software and technology*; Pub 1996 ACM Press New York, NY, USA; (1996),51-58.

Cowperthwaite, David J., "Occlusion Resolution Operators for Three-Dimensional Detail-In-Context", Burnaby, British Columbia: *Simon Fraser University*; (2000),166 pages.

Carpendale, M. Sheelagh T., "A Framework for Elastic Presentation Space", *Thesis Simon Fraser University*, XP001051168; cited in the application, Chapter 3-5; appendix A,B; (Mar. 1999),pp. 1-271.

Carpendale, M. Sheelagh T., et al., "Exploring Distinct Aspects of the Distortion Viewing Paradigm", Technical Report TR 97-08, *School of Computer Science*, Simon Fraser University, Burnaby, British Columbia, Canada; (Sep. 1997),14 pages.

Cowperthwaite, David J., et al., "Visual Access for 3D Data", *Proceedings of ACM CHI 96 Conference on Human Factors in Computer Systems*, vol. 2 of Short Papers: Alternative Methods of Interaction; (1996),5 pages.

Keahey, T. A., "Visualization of High-Dimensional Clusters Using Nonlinear Magnification", Technical Report LA-UR-98-2776, *Los Alamos National Laboratory*; (1998),8 pages.

Tigges, M. et al., "Generalized Distance Metrics for Implicit Surface Modeling", *Proceedings of the Tenth Western Computer Graphics Symposium*; (Mar. 1999),5 pages.

Bossen, Frank "Anisotropic Mesh Generation With Particles", Technical Report CMU-CS-96-134, *CS Dept, Carnegie Mellon University*; (May 13, 1996),pp. 1-59.

Bossen, Frank J., et al., "A Pliant Method for Anisotropic Mesh Generation", *5th Intl. Meshing Roundtable*; (Oct. 1996),pp. 63-74.

Wilson, et al., "Direct Volume Rendering Via 3D Textures", Technical Report UCSC-CRL-94-19, University of California, Santa Cruz, *Jack Baskin School of Engineering*; (Jun. 1994),11 pages.

Carpendale, M. Sheelagh T., "A Framework for Elastic Presentation Space", *PhD thesis*, Simon Fraser University; Available at <http:// pages.cpsc.ucalgary.ca/~sheelagh/wiki/uploads/Main/Thesis/pre. pdf>,(Mar. 1999),pp. 69, 72, 78-83,98-100, 240, 241.

Keahey, T. A., et al., "Techniques for Non-Linear Magnification Transformations", Information Visualization '96, *Proceedings IEEE Symposium* on, San Francisco, CA, Los Alamitos, CA, USA, IEEE Comput. Soc, US: XP010201943; ISBN: 0-8186-7668-X the whole document,(Oct. 28, 1996),pp. 38-45.

Tominski, Christian et al., "Fisheye Tree Views and Lenses for Graph Visualization", pp. 1-8, 2006.

Keahey, T. A., "Getting Along: Composition of Visualization Paradigms", *Visual Insights, Inc.*; (2001),4 pages.

Sakamoto, Chikara et al., "Design and Implementation of a Parallel Pthread Library (PPL) with Parallelism and Portability", *Systems and Computers in Japan*, New York, US, vol. 29, No. 2; XP000752780, ISSN: 0882-1666 abstract,(Feb. 1, 1998),pp. 28-35.

Deng, Ke et al., "Texture Mapping with a Jacobian-Based Spatially-Variant Filter", *Proceedings 10th Pacific Conference on Computer Graphics and Applications*, XP00224932, ISBN; 0-7695-1784-6 the whole document,(Oct. 2002),pp. 460-461.

Welsh, Michelle "Futurewave Software", *Business Wire*; (Nov. 15, 1993),2 Pages.

Lamar, Eric et al., "A Magnification Lens for Interactive Volume Visualization", *ACM*; Ninth Pacific Conference on Computer Graphics and Applications (PG'01), (Oct. 2001),pp. 1-10.

Fitzmaurice, George et al., "Tracking Menus", *UIST*; (2003),pp. 71-79.

Stone, et al., "The movable filter as a user interface tool", *Proceedings of CHI ACM*; (1992), 18 pages.

Doyle, et al., "Graphical User Interface for Detail-In-Context Presentations", U.S. Appl. No. 10/137,648, filed May 3, 2002, (May 15, 2002),15 pages.

Baudisch, P. et al., "Halo: a Technique For Visualizing Off-Screen Locations", *CHI*; Retrieved from: <wwww.patrickbaudisch.com/.../2003-Baudisch-CHI03-Halo.pdf<, (Apr. 5-10, 2003),8 pages.

Baudisch, Patrick et al., "Drag-And-Pop: Techniques for Accessing Remote Screen Content on Touch-and-Pen-Operated Systems", *Interact '03*, (2003),pp. 57-64.

Carpendale, M. Sheelagh T., et al., "Making Distortions Comprehensible", *Visual Languages, Proceedings, 1997 IEEE Symposium* on Isle of Capri, Italy, Los Alamitos, CA, USA, IEEE Comput. Soc., US, Sep. 23, 1997; XP010250566, ISBN: 0-8186-8144-6,(Sep. 23-26, 1997),pp. 36-45.

Ito, Minoru et al., "A Three-Level Checkerboard Pattern (TCP) Projection Method for Curved Surface Measurement", *Pattern Recognition*, vol. 28, No. 1, XP004014030, ISSN 0031-3203,(1995),pp. 27-40.

Keahey, T. A., et al., "Nonlinear Magnification Fields", *Information Visualization, 1997, Proceedings, IEEE Symposium* on Phoenix, AZ, USA, Los Alamitos, CA, USA, IEEE Comput. Soc., US; XP010257169; ISBN: 0-8186-8189-6,(Oct. 1997),pp. 51-58 and 121.

Rauschenbach, Uwe "The Rectangular Fish Eye View as an Efficient Method for the Transmission and Display of Large Images", *Image Processing, ICIP 99, Proceedings, 1999 International Conference* On, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (Oct. 1999),pp. 115-119.

Keahey, T. A., "Nonlinear Magnification", (*Indiana University Computer Science*), (1997), 196 pages.

Watt, et al., "Advanced Animation and Rendering Techniques", (*Addison-Wesley Publishing*), (1992),p. 106-108.

Boots, Barry N., "Delaunay Triangles: An Alternative Approach to Point Pattern Analysis", *Proceedings of the Association of American Geographers*, vol. 6, (1974),pp. 26-29.

Carpendale, M. Sheelagh T., et al., "Distortion Viewing Techniques for 3-Dimensional Data", *Information Visualization '96, Proceedings IEEE Symposium* on San Francisco, CA, USA, Los Alamitos, CA, USA, IEEE Comput. Soc, US Oct. 28, 1996; XP010201944; ISBN: 0-8186-7668-X,(Oct. 1996),8 pages.

Leung, Y. K., et al., "A Review and Taxonomy of Distortion-Oriented Presentation Techniques", *ACM Transactions on Computer-Human Interaction*, 'Online! vol. 1, No. 2, XP002252314; Retrieved from the Internet: <URL:http://citeseer.nj.nec.com/ leung94review.html> 'retrieved on Aug. 21, 2003! the whole document,(Jun. 1994),pp. 126-160.

"Non Final Office Action", U.S. Appl. No. 10/358,394, (Mar. 13, 2009),36 pages.

Sarkar, Manojit et al., "Stretching the Rubber Sheet: A Metaphor for Viewing Large Layouts on Small Screens", *Proc. of the 6th Annual ACM Symposium. on User interface Software and Technology*, Atlanta, GA, (Nov. 1993),pp. 81-91.

Carpendale, M. Sheelagh T., et al., "Graph Folding: Extending Detail and Context Viewing into a Tool for Subgraph Comparisons", *In Proceedings of Graph Drawing 1995*, Passau, Germany, (1995),13 pages.

Carpendale, M. Sheelagh T., "A Framework for Elastic Presentation Space", Available at <http://pages.cpsc.ucalgary.ca/~sheelagh/personal/thesis/>,(Nov. 19, 1999),1 page.

"Non Final Office Action", U.S. Appl. No. 11/542,120, (Jan. 22, 2009),12 pages.

"Final Office Action", U.S. Appl. No. 11/410,024, (Mar. 11, 2009), 20 pages.

"Foreign Office Action", Application Serial No. 2002-536993, (Mar. 11, 2009), 2 pages.

"Notice of Allowance & Examiner's Amendment", U.S. Appl. No. 11/401,349, (Apr. 17, 2009),10 pages.

Schmalstieg, Dieter et al., "Using Transparent Props for Interaction with the Virtual Table", *Proceedings of the 1999 symposium on Interactive 3D graphics.*, (Apr. 26, 1999),8 pages.

"Final Office Action", U.S. Appl. No. 10/705,199, (May 12, 2009),13 pages.

"Non Final Office Action", U.S. Appl. No. 11/541,778, (Jun. 19, 2009),11 pages.

"Non Final Office Action", U.S. Appl. No. 11/673,038, (Jul. 13, 2009), 30 pages.

"Non Final Office Action", U.S. Appl. No. 11/410,024, (Jul. 20, 2009),12 pages.

Smith, Philip W., et al., "Efficient Techniques for Wide-Angle Stereo Vision Using Surface Projection Models", *1999 Conference on Computer Vision and Pattern Recognition*, Available at <http://ieee.org/stamp.jsp?arnumber=17045>,(Jun. 1999),pp. 113-118.

"Non Final Office Action", U.S. Appl. No. 11/159,205, (Jul. 27, 2009),13 pages.

"Advisory Action", U.S. Appl. No. 11/249,493, (Aug. 11, 2009), 5 pages.

"Advisory Action", U.S. Appl. No. 10/705,199, (Aug. 18, 2009), 3 pages.

"Restriction Requirement", U.S. Appl. No. 11/935,222, (Aug. 20, 2009), 6 pages.

"Advisory Action", U.S. Appl. No. 11/249,493, (Sep. 14, 2009), 4 pages.

"Non-Final Office Action", U.S. Appl. No. 12/364,450, (Sep. 30, 2009),10 pages.

"Notice of Allowance", U.S. Appl. No. 10/358,394, (Oct. 8, 2009), 7 pages.

"Final Office Action", U.S. Appl. No. 11/935,222, (Nov. 24, 2009), 8 pages.

"Final Office Action", U.S. Appl. No. 11/541,778, (Dec. 4, 2009),12 pages.

"Notice of Allowance", U.S. Appl. No. 11/214,886, (Dec. 15, 2009),16 pages.

"BPAI Decision", U.S. Appl. No. 10/682,298, (Dec. 30, 2009),14 pages.

"Notice of Allowance", U.S. Appl. No. 11/410,024, (Jan. 4, 2010), 7 pages.

"Final Office Action", U.S. Appl. No. 11/673,038, (Jan. 8, 2010), 33 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

"Restriction Requirement", U.S. Appl. No. 12/368,263, (Mar. 9, 2010), 7 pages.

"Notice of Allowance", U.S. Appl. No. 10/705,199, (Mar. 10, 2010),18 pages.

"Non Final Office Action", U.S. Appl. No. 11/691,686, (Mar. 18, 2010),17 pages.

"Advisory Action", U.S. Appl. No. 11/673,038, (Mar. 25, 2010), 7 pages.

"Final Office Action", U.S. Appl. No. 11/159,205, (Mar. 25, 2010),16 pages.

"Notice of Allowance", U.S. Appl. No. 12/364,450, (Apr. 19, 2010), 4 pages.

"Non-Final Office Action", U.S. Appl. No. 11/236,694, (Apr. 20, 2010), 9 pages.

* cited by examiner

METHOD AND SYSTEM FOR DISPLAYING STEREOSCOPIC DETAIL-IN-CONTEXT PRESENTATIONS

CROSS REFERENCE TO RELATED APPLICATIONS

This application is a continuation of U.S. patent application Ser. No. 11/410,024, filed Apr. 25, 2006, which is a continuation of U.S. application Ser. No. 10/289,453 filed Nov. 7, 2002, now U.S. Pat. No. 7,088,364, which claims priority from Canadian Patent Application 2,361,341 filed Nov. 7, 2001, the entire disclosures of each application are incorporated herein by reference.

BACKGROUND

Display screens are the primary interface for displaying information from a computer. Display screens are limited in size, thus presenting a challenge to graphical user interface design, particularly when large amounts of information are to be displayed. This problem is normally referred to as the "screen real estate problem."

Traditional solutions to this problem include panning, zooming, scrolling or combinations thereof. While these solutions are suitable for a large number of visual display applications, these solutions become less effective where sections of the visual information are spatially related, such as maps, three-dimensional representations, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region" or "detail") in a data presentation while preserving visibility of the surrounding information (the "context"). This technique has applicability to the display of large surface area media, such as maps, on limited size computer screens including laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display.

In present detail-in-context presentation systems, when a lens is applied to a two-dimensional continuous surface representation, for example, the resulting presentation appears to be three-dimensional. In other words, the lens transformation appears to have stretched the continuous surface in a third dimension. In addition, shading the area transformed by the lens further reinforces the three-dimensional effect of the resulting presentation. Thus, in present systems, stretching and shading, two monocular perceptual cues, are used to provide an illusion of depth for detail-in-context presentations displayed on two-dimensional display screens.

One shortcoming of these detail-in-context presentation systems is that the monocular stretching and shading techniques do not generally yield effective three-dimensional effects for a range of presentations. This is especially so for presentations that include stereoscopically paired images or anaglyphs. For example, the ability to provide users with three-dimensional effects that are comfortable to view is of great value in extending the capabilities of detail-in-context presentations to applications involving essentially planar representations having data with relatively small depth differences. Such applications may include digital maps produced from stereoscopic satellite images.

Therefore, effective display of stereoscopic detail-in-context presentations can be difficult in using traditional techniques and presentation systems. Consequently, stereoscopic presentation techniques are described herein that can be employed to obviate or mitigate at least some of the above mentioned disadvantages.

SUMMARY

In general, the techniques are described herein for the effective presentation of stereoscopic detail-in-context presentations in detail-in-context presentation systems through the use of improved stereoscopic rendering techniques and an improved graphical user interface.

According to one embodiment, there is provided a method for generating a stereoscopic presentation of a region-of-interest in a monoscopic information representation comprising The steps of: (a) selecting first and second viewpoints for the region-of-interest; (b) creating a lens surface having a predetermined lens surface shape for the region-of-interest, the lens surface having a plurality of polygonal surfaces constructed from a plurality of points sampled from the lens surface shape; (c) creating first and second transformed presentations by overlaying the representation on the lens surface and perspectively projecting the lens surface with the overlaid representation onto a plane spaced from the first and second viewpoints, respectively; and, (d) displaying the first and second transformed presentations on a display screen to generate the stereoscopic presentation.

According to another embodiment, there is provided a method for generating a stereoscopic presentation of a region-of-interest in a stereoscopic information representation, the stereoscopic information representation including first and second images, comprising the steps of: (a) selecting a viewpoint for the region-of-interest; (b) creating a lens surface having a predetermined lens surface shape for the region-of-interest, the lens surface having a plurality of polygonal surfaces constructed from a plurality of points sampled from the lens surface shape; (c) creating first and second transformed presentations by overlaying the first and second images on the lens surface and perspectively projecting the lens surface with the overlaid first and second images onto a plane spaced from the viewpoint, respectively; and, (d) displaying the first and second transformed presentations on a display screen to generate the stereoscopic presentation.

According to another embodiment, there is provided a method for generating a stereoscopic presentation of a region-of-interest in a stereoscopic information representation, the stereoscopic information representation including first and second images, comprising the steps of: (a) selecting first and second viewpoints for the region-of-interest; (b) creating a lens surface having a predetermined lens surface shape for the region-of-interest, the lens surface having a plurality of polygonal surfaces constructed from a plurality of points sampled from the lens surface shape; (c) creating first and second transformed presentations by overlaying the first and second images on the lens surface and perspectively projecting the lens surface with the overlaid first and second images onto a plane spaced from the first and second viewpoints, respectively; and, (d) displaying the first and second transformed presentations on a display screen to generate the stereoscopic presentation.

According to another embodiment, there is provided a graphical user interface (GUI) for manipulating a stereoscopic presentation of a region-of-interest in an information representation displayed on a display screen of a computer display system, the computer display system including the display screen, a computer, and a pointing device for positioning a cursor on the display screen. The GUI includes: (a) a representation of a first slide bar, the first slide bar having a first active area, the first active area for adjusting a separation distance between first and second viewpoints for the region-of-interest by repositioning the first active area with the pointing device; (b) a representation of a second slide bar, the second slide bar having a second active area, the second active area for adjusting a height of a projection plane for generating the presentation above a basal plane by repositioning the second active area with the pointing device; and, (c) a representation of a third slide bar, the third slide bar having a third active area, the third active area for adjusting a height of GUI interface icons, including the first, second, and third slide bars, above the basal plane by repositioning the third active area with the pointing device.

According to another embodiment, a stereoscopic presentation can be used for converting a raster representation to a vector representation by inversion of the stereoscopic presentation.

According to another embodiment, a stereoscopic presentation can be used for editing or annotating a representation by inversion of the stereoscopic presentation.

Advantageously, the stereoscopic rendering techniques described herein may be applied to a wide variety of detail-in-context presentations. In particular, the described techniques can improve the presentation of three-dimensional detail-in-context effects in applications involving essentially planar representations having data with small depth differences (e.g. digital maps produced from stereoscopic satellite images). These stereoscopic rendering techniques provide, for example, the effect or illusion that a lensed area of a presentation is protruding out of the display screen toward a user. Further, through a graphical user interface, a user may quickly and easily adjust stereoscopic lens parameters for improved viewing comfort.

BRIEF DESCRIPTION OF THE DRAWINGS

Various embodiments can be understood by referring to the following description and accompanying drawings. In the description and drawings, line numerals refer to like structures or processes. In the drawings.

DETAILED DESCRIPTION

Figure 1:
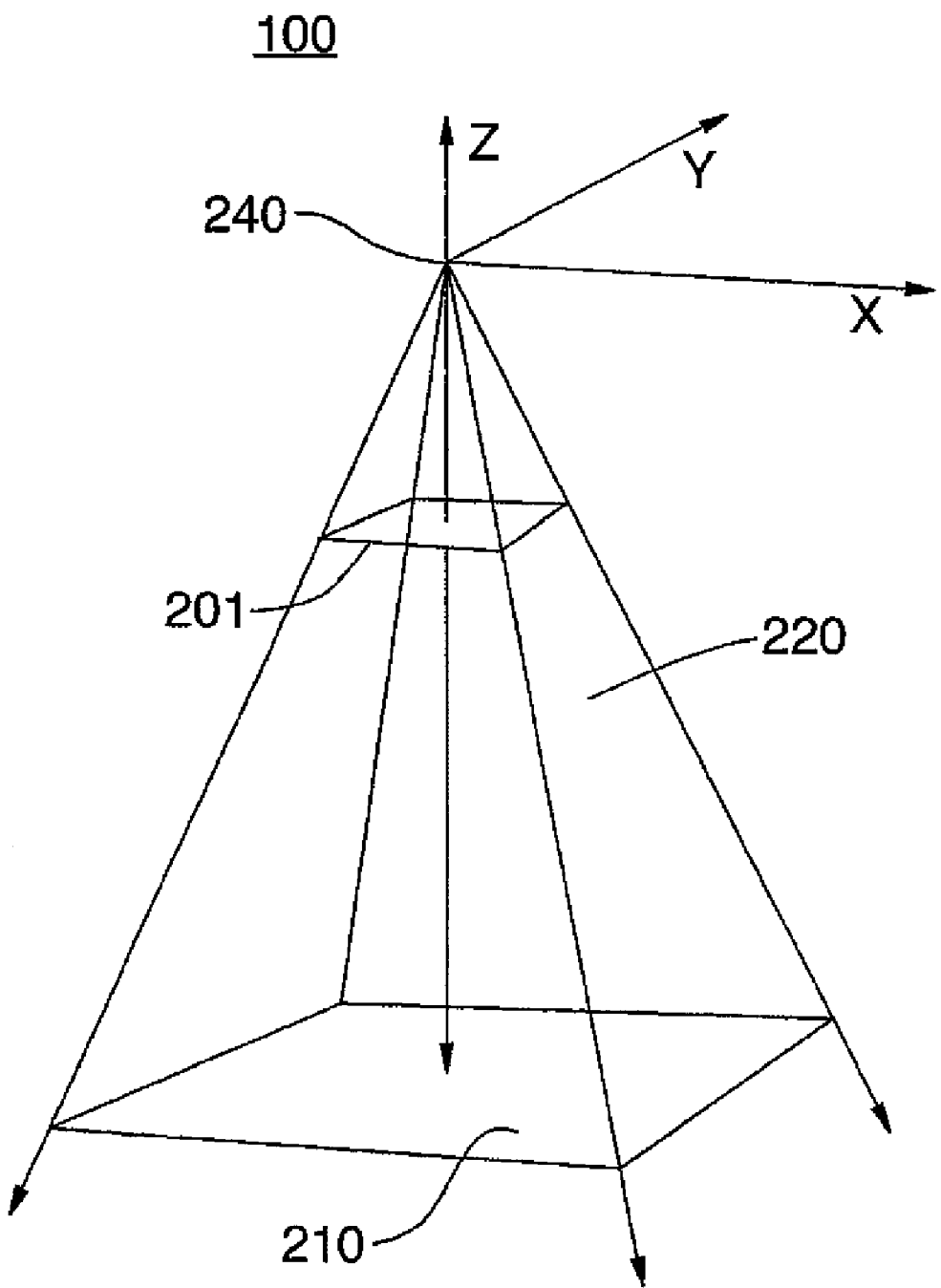
FIG. 1 is a graphical representation of the geometry for constructing a three-dimensional (3D) perspective viewing frustum, relative to an x, y, z coordinate system, in accordance with known elastic presentation space graphics technology.

In the following description, numerous specific details are set forth to provide a thorough understanding of the described techniques. However, it is understood that the invention may be practiced without these specific details. In other instances, well-known software, circuits, structures and techniques have not been described or shown in detail in order for the sake of simplicity. In the drawings, like numerals refer to like structures or processes.

The term "data processing system" is used herein to refer to any machine for processing data, including the computer systems and network arrangements described herein. The term "Elastic Presentation Space" ("EPS") (or "Pliable Display Technology" ("PDT")) is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in "A Framework for Elastic Presentation Space" (Carpendale, Marianne S. T., A Framework for Elastic Presentation Space (Burnaby, British Columbia: Simon Fraser University, 1999)), which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. ID EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
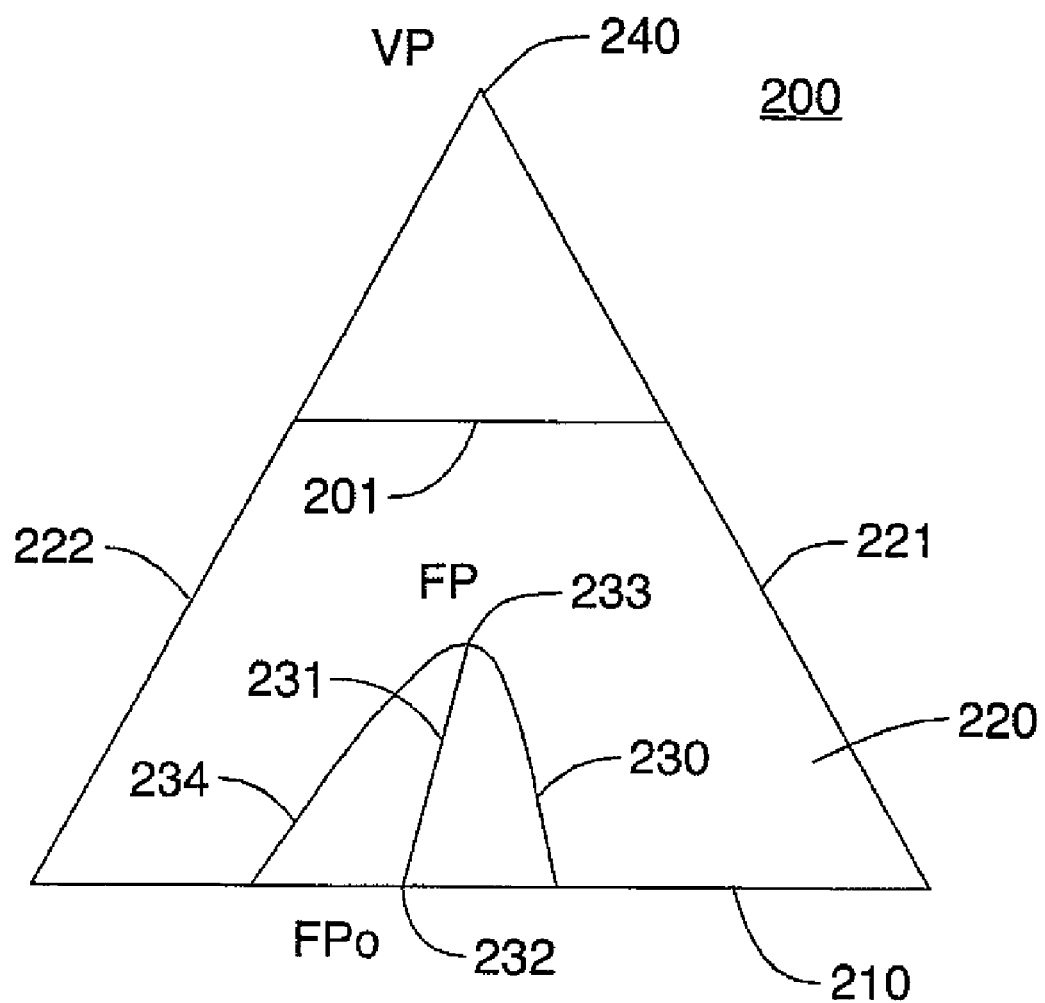
FIG. 2 is a graphical representation of the geometry of a presentation in accordance with known elastic presentation space graphics technology.

FIG. 2 is a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 Through the point FP 233 which corresponds to the focus or focal region or focal point of the distorted surface 230.

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between The reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
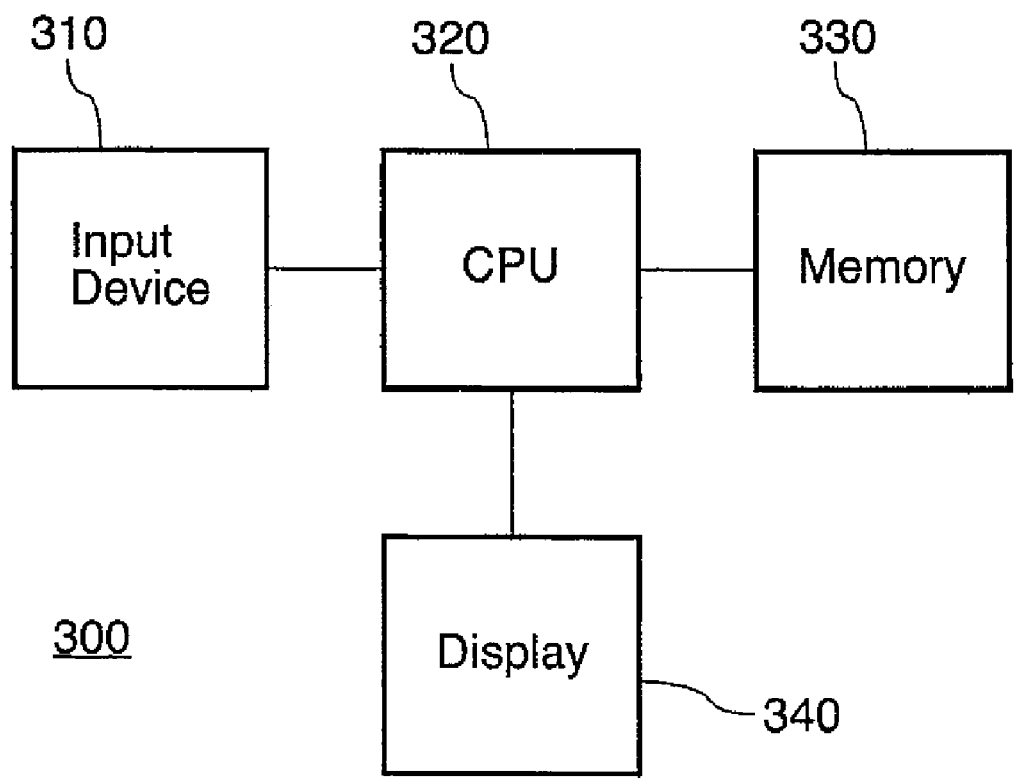
FIG. 3 is a block diagram illustrating an exemplary data processing system for implementing one or more embodiments.

System. FIG. 3 is a block diagram of an exemplary data processing system 300 for implementing one or more embodiments. The data processing system is suitable for implementing EPS technology and for viewing stereoscopic presentations in conjunction with a graphical user interface ("GUI"). The data processing system 300 includes an input device 310, a central processing unit or CPU 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen or terminal device and a stereoscopic viewing device (not shown). The stereoscopic viewing device may include a pair of 3D anaglyph (i.e. red/blue, red/green, etc.) glasses or a pair of 3D shutter glasses with supporting hardware and software. The display 340 may also include split level screens. The data processing system 300 has stored therein data representing sequences of instructions which when executed cause the techniques described herein to be performed. Of course, the data processing system 300 may contain additional software and hardware a description of which is not necessary for understanding the described techniques.

Figure 5:
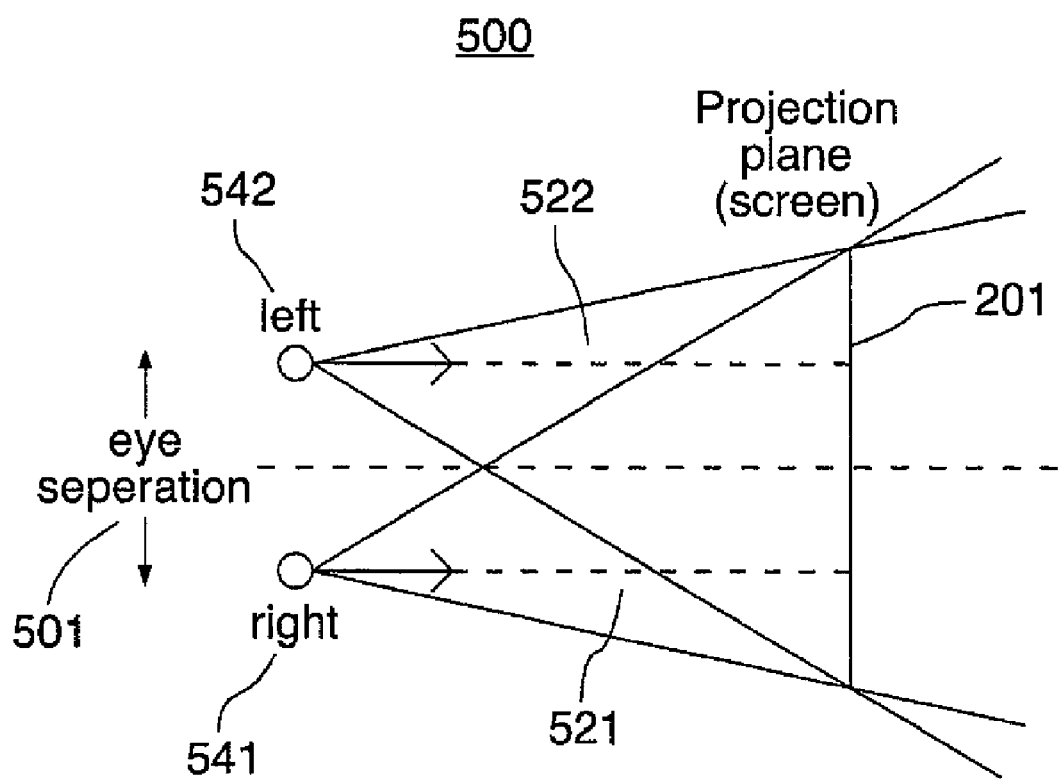
FIG. 5 is a graphical representation of the geometry for constructing stereoscopic perspective viewing frustums in accordance with one or more embodiments; and, FIG. 6 is a flow chart illustrating a general method for a general method for generating a stereoscopic presentation of a region-of-interest in a monoscopic information representation in accordance with one or more embodiments.

Stereoscopic Detail-In-Context Presentations from Monoscopic Images. FIG. 5 is a graphical representation 500 of the geometry for constructing stereoscopic perspective viewing frustums in accordance with one or more embodiments. In FIG. 5, the right-eye and left-eye viewpoints 541, 542 lie at the apex of right-eye and left-eye perspective viewing frustums 521, 522, respectively. The right-eye and left-eye viewpoints 541, 542 are spaced by an "eye separation" distance 501.

According to an embodiment, stereoscopic detail-in-context presentations are generated from monoscopic images. In general, a monoscopic representation of a 3D object is rendered or presented stereoscopically by rendering the representation twice, once from a right-eye viewpoint 541 and once from a left-eye viewpoint 542. If no lens is applied to the representation, the right and left renderings are generally the same (i.e. for images that are not stereo pairs). If a lens is applied, the required point displacements are calculated by software stored in the data processing system 300 and stored as 3D coordinates in the system's memory 330. These newly displaced points are then rendered or projected twice using separate perspective viewing volumes or frustums 521, 522. The rendered images are then overlaid (or interlaced) to produce the final presentation for display to the user. In general, this point displacement or transformation operation includes the generation of a 3D mesh or polygonal surface grid, produced by sampling from the shape of the surface corresponding to the lens or 3D distortion function, and the overlaying or texture-mapping of the representation onto this 3D mesh to produce the required point displacements. The generation of 3D meshes is described in U.S. patent application Ser. No. 09/978,773, filed by the present applicant, and incorporated herein by reference. Advantageously, processing time is saved by using one transformation operation followed by two projection operations.

In general, when viewed without a stereoscopic viewing device, the area 233, 234 within the lens 230 appears as doubled to the user. The distance between a point rendered by the right viewing volume 521 and the same point rendered with the left viewing volume 522 may be referred to as "parallax". The greater the parallax, the more the object appears to a user to be protruding from the plane of the display screen 340. The degree or amount of parallax is affected by the height of a data point above the basal plane 210, or more generally by the distance of the data point from the projection plane 201, and the horizontal distance between the viewpoints 541, 542 of the two perspective viewing volumes, that is, the eye separation 501. As described by Valyrus in "Stereoscopy" (Valyrus, N. A., Stereoscopy, London: Focal Press, 1966), which is incorporated herein by reference, too much parallax in a presentation can be uncomfortable for a user to view. In general, parallax will be at a maximum in the focal region 233 of a lens 230.

Typically, a representation that is viewed through a lens presentation has a finite resolution. Given this resolution, software stored in the system 300 calculates the maximum height of the lens corresponding to the maximum level of magnification for this resolution. In general, the maximum height is measured from the basal plane 210 The lens height may be readily determined given a predetermined or user selected magnification level. Using this maximum height, the software adjusts the eye separation 501 such that the maximum parallax will not be uncomfortable to a user when viewing the presentation. It is, of course, difficult to determine when an individual user's comfort level will be exceeded. For example, some users may be comfortable with a small level of parallax. Experimentally, it has been determined that having parallax levels greater than one-half inch (i.e. when the display screen is viewed from a distance of approximately 1.5 feet) is uncomfortable for many users. In this respect, refer again to Valyrus (Valyrus, N. A., Stereoscopy, London, New York: Focal Press, 1962; incorporated herein by reference). As will be described below, if a user is comfortable with larger parallax levels, the user can adjust eye separation 501 manually.

For representations that have infinite resolution, vector data for example, the maximum height of the lens is chosen based on a predetermined maximum amount of compression for the shoulder region 234 of the lens 230 for a predetermined average lens size (i.e. lensed area). Again, a user may adjust eye separation 501 manually.

Stereoscopic Derail-In-Context Presentations from Stereoscopic Images. According to an embodiment, stereoscopic detail-in-context presentations are generated from stereoscopic images (i.e. stereoscopically paired images). In general, lenses are applied to representations consisting of stereoscopically paired images by displacing the points on both images and rendering the left and right images consecutively using perspective projection. The rendered images are then overlaid (or interlaced) to produce the final presentation for display to the user. Here, one perspective viewing volume 220 is used, two stereo images are displaced onto a single 3D mesh, and the mesh is viewed monoscopically. In this case, parallax derives from the stereo images but not from the height of the lenses. Advantageously, processing time is saved by calculating the displacements once, using a finitely subdivided 3D mesh, and then consecutively texture-mapping the right and left images on this mesh That is, rather than requiring two 3D meshes (i.e. one for each image), one 3D mesh is generated corresponding to the lens and this is followed by two texture-mapping operations which consecutively overlay each original image on the mesh. These operations are then followed by a projection operation for each image using a single perspective viewing volume 220.

When viewed with a stereoscopic viewing device, the resultant images will have their original stereo effect where they are not distorted by the lens. In the lensed area, the stereo effect will be intensified in the focal region 233 and generally reduced in the shoulder region 234. In general, the areas of the shoulder 234 that compress the data horizontally will decrease the parallax. In the shoulder region 234, the perception of depth will be affected by the steepness of the shoulder.

For representations consisting of stereoscopically paired images, the maximum parallax may be adjusted by the software to account for the additional parallax that will result when the lens transformation is applied to the original stereoscopic representation. In this situation, the software may decrease the eye separation 501. In general, the method described above for monoscopic images is used to adjust the parallax, but rather than using the maximum height of the lens, the maximum (or average) parallax present in the image itself is used. For example, consider a stereo image that includes an image of a building where the building protrudes from the stereo image. At full magnification, the parallax level must be comfortable for a user. If the building is higher than the lens (i.e. in the focal region), then if the eye separation 501 is adjusted such that viewing of the building is comfortable to a user, then, the lens will also be comfortable to view. In addition, because viewing discomfort varies from user to user, the system 300 includes means such as a GUI and mouse input device 310 to allow users to manually adjust eye separation 501. This GUI is described in more detail below.

Alternatively, a red/blue (or, red/green, etc.) anaglyph may be created from the stereoscopically paired images and rendered using the method described above for monoscopic images. In general, an anaglyph is an image consisting of two slightly different perspectives (e.g. right and left eye views) of the same object in contrasting colors (e.g. red and blue) that are superimposed on each other, producing a 3D effect when viewed through two correspondingly colored filters. An advantage of this alternative is that the stereoscopic viewing device may consist of a simple pair of 3D anaglyph (i.e. red/blue, red/green, etc.) glasses rather than more complex 3D shutter glasses. Anaglyphs may be created using readily available off-the-shelf software.

Stereoscopic Detail-In-Context Presentations with Stereoscopic Lenses. According to an embodiment, stereoscopic detail-in-context presentations with stereoscopic lenses are generated from stereoscopic images. Generally, viewing stereoscopically paired images with non-stereoscopic lenses may be incongruous. The lack of depth in the lenses may be disturbing to the user because while the user is accustomed to perceiving depth in the original stereoscopic image, and while there are strong monocular cues that the lens is 3D, the appearance of the 3D effects in the lensed area may differ from the appearance of the 3D effects outside of the lensed area. Advantageously, the stereo viewing methods described can be combined to view stereoscopically paired images with stereoscopically rendered lenses to reduce this incongruity. Here, two perspective viewing volumes 521, 522 are used, two stereo images are displaced onto a single 3D mesh, and the mesh is viewed stereoscopically. In this case, parallax derives from both the stereo images and from the height of the lenses.

In general, stereoscopic lenses are rendered such that the zero parallax setting ("ZPS") of the original image is lifted by the height of the lens 230 in the focal 233 and shoulder 234 regions. The ZPS is that height above the basal plane of the original images where the distance between a point in the first or right view 541 and the same point in the second or left view 542 is zero. In general, ZPS corresponds to the projection plane 201 where, conceptually, there should be no perceived height. In effect, if an area of the original image appeared to be sunk into the display screen when viewed by a user, that area will appear to be sunk into the lens. Similarly, if an area of the original image appeared to be protruding from the display screen, it will appear to be protruding from the lens. Note that the eye separation 501 used for the stereoscopic lenses will not affect the parallax of the resultant image or presentation. The eye separation 501 influences the depth perception of the lenses. In this case, as each stereoscopic image is laid over a mesh, which is then viewed stereoscopically, there is a ZPS associated with the original images and a ZPS associated with the stereoscopically viewed mesh. These ZPSs may be referred to as the image ZPS and the mesh ZPS, respectively. Again, because viewing discomfort varies from user to user, the system 300 includes means such as a GUI and mouse input device 310 to allow users to manually adjust parameters including eye separation, image ZPS, and mesh ZPS.

GUI with Stereoscopic Lens Control Elements. GUIs for non-stereo detail-in-context presentations are described in U.S. patent application Ser. Nos. 10/137,648 and 10/166,736, filed by the present applicant, and incorporated herein by reference. Generally, with a GUI, a user interacts with icons and controls in a GUI display by moving a pointing device, such as a mouse, which causes a cursor or pointer to be moved on the display. When the pointer is over the displayed icon or control, the user presses a button, such as a mouse button, to invoke one or more operations to be performed by the computer system. In the following, a GUI having lens control elements that can be implemented in software and applied to the control of stereoscopic detail-in-context data presentations is described. The software can be loaded into and run by the data processing system 300 of FIG. 3.

Figure 4:
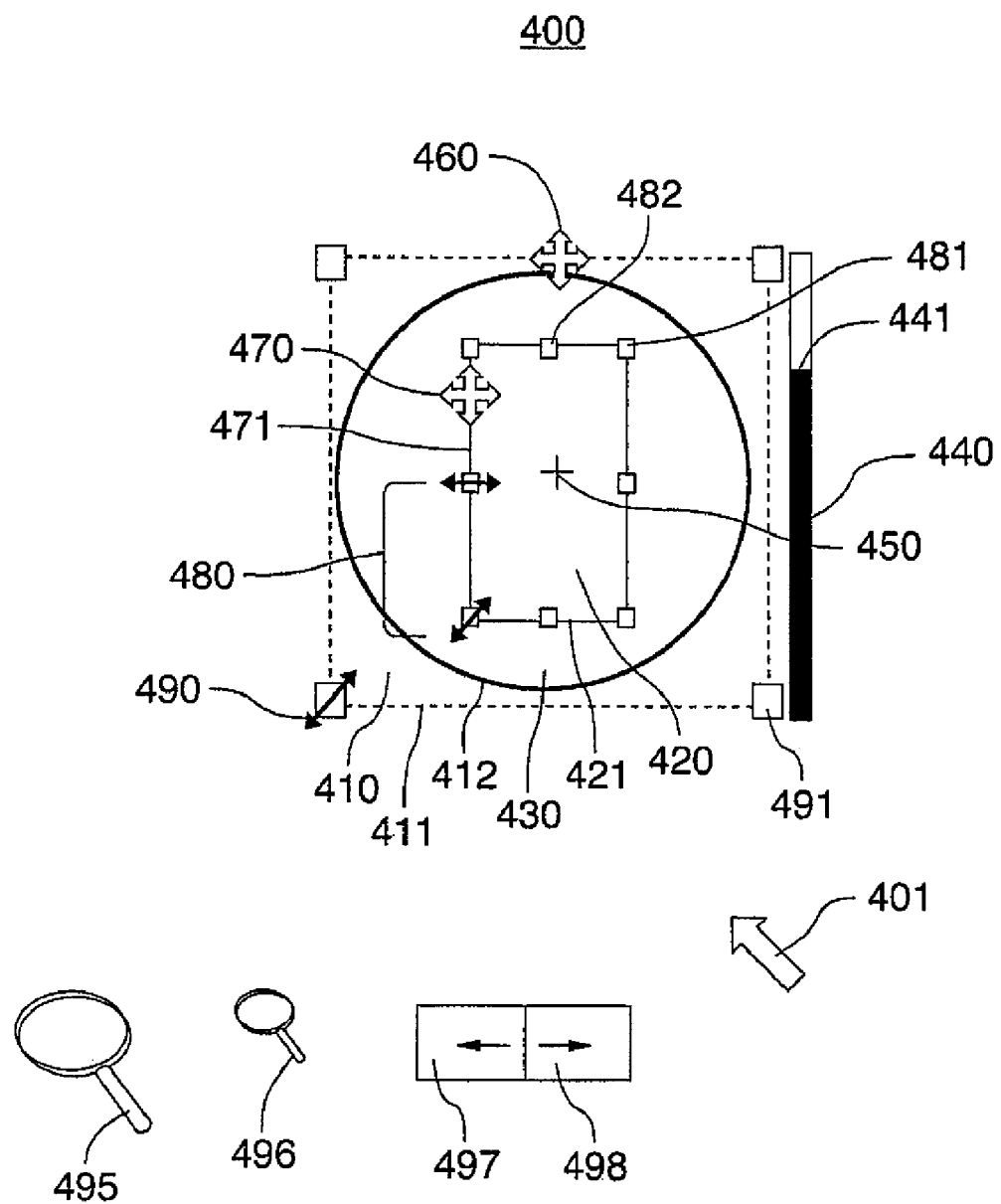
FIG. 4 a partial screen capture illustrating a graphical user interface having lens control elements for user interaction with stereoscopic detail-in-context data presentations in accordance with one or more embodiments.

FIG. 4 is a partial screen capture illustrating a GUI 400 having lens control elements for user interaction with stereoscopic detail-in-context data presentations in accordance with one or more embodiments. As mentioned above, detail-in-context data presentations are characterized by magnification of areas of an image where detail is desired, in combination with compression of a restricted range of areas of the remaining information (i.e. the context), the end result typically giving the appearance of a lens having been applied to the display screen surface. This stereoscopic lens 410 includes a focal region 420 having high magnification, a surrounding shoulder region 430 where information is typically visibly compressed, and a base 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. Referring again to FIG. 2, in general, the stereoscopic lens 410 corresponds to projections of the distorted surface 230, focal region 233, and shoulder region 234 onto the reference view plane 201.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of a pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing The pointing device 310 on the display surface 340 (e.g. cursor) to the appropriate component of the lens 410. For example, "dragging" of The pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the described techniques may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the techniques described herein may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, and zoom. According to an embodiment, the GUI 400 may include the following additional lens control elements that are applicable to stereoscopic detail-in-context presentations: GUI height, eye separation, image ZPS, and mesh ZPS. Each of these lens control elements generally has at least one lens control icon or alternate cursor icon associated with it. In general, when a lens 410 is selected by a user Through a point and click operation, the following lens control icons may be displayed over the lens 410: pickup icon 450, base outline icon 412, base bounding rectangle icon 411, focal region bounding rectangle icon 421, handle icons 481, 482, 491, magnify slide bar icon 440, and zoom icon 495. In addition, GUI height, eye separation, image ZPS, and mesh ZPS icons (not shown) may be displayed over the lens 410 or on a toolbar or pull-down menu. Typically, these icons are displayed simultaneously after selection of the lens 410. In addition, when the cursor 401 is located within the extent of a selected lens 410, an alternate cursor icon (e.g. 460, 470, 480, 490, 496) may be displayed over the lens 410 to replace the cursor 401 or may be displayed in combination with the cursor 401. In addition, when GUI height, eye separation, image ZPS, or mesh ZPS functionality is selected by the user, for example, through a toolbar or pull-down menu, corresponding alternate cursor icons (note shown) may be displayed to replace the cursor 401 or may be displayed in combination with the cursor 401. The move, pickup, resize base, resize focus, fold, magnify, and zoom lens control elements are described in U.S. patent application Ser. Nos. 10/137,648 and 10/166,736 mentioned above. The GUI height, eye separation, image ZPS, and mesh ZPS lens control elements and their effects on the characteristics of a lens 410 are described below.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the described techniques to provide a bounding region having a shape other than generally rectangular. Such a bounding region could be of any of a great number of shapes including oblong, oval, ovoid, conical, cubic, cylindrical, polyhedral, spherical, etc. Moreover, the cursor 401 provides a visual cue indicating the nature of an available lens control element. As such, the cursor 401 will generally change in form by simply pointing to or selecting a different lens control icon (e.g. 450, 412, 411, 421, 481, 482, 491, 440, 495). For example, when residing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

GUI Height. In general, because the focal region 233 of a stereoscopic lens 410 appears to be protruding from the display screen when viewed by a user, the lens control icons (e.g. 450, 412, 411, 421, 481, 482, 491, 440, 495) of the GUI 400 are rendered in stereo so that these tens control icons appear at the same height as the focal region 233. This is accomplished by elevating the lens control icons by a predetermined or user selected amount and rendering them twice, once using a left-eye viewing volume, and again using a right-eye viewing volume. The same viewing volumes used to render the stereoscopic lens may be used. The predetermined or default height for the top of the lens control icons of the GUI may be set by the software to the height of the top of the lens.

User adjustment of the height of the lens control icons of the GUI 400 relative to the height of the lens 410 is provided by the GUI height lens control element of the GUI. After the lens 410 is selected, the GUI height control element is presented to the user as a slide bar icon (not shown) near or adjacent to the lens 410 and typically to one side of the lens 410. Sliding the bar (not shown) of the slide bar results in a proportional change in the height of the lens control icons of the GUI relative to the height of the lens 410. The slide bar not only informs the user that the height of the control icons of the GUI may be selected, but also provides the user with an indication as to what level of height control is possible. The slide bar includes a bar that may be slid up and down, or left and right, to adjust and indicate the height of the lens control icons of the GUI. To adjust the height of the lens control icons, the user would click on the bar of the slide bar and drag in the direction of desired height. Once the desired height is reached, the user would release the mouse button 310. The lens 410 is then locked with The selected height for the lens control icons until a further GUI height operation is performed.

Alternatively, rather than using a slide bar icon to implement the GUI height function, a GUI height function menu with multiple items (not shown) or multiple GUI height function icons (not shown) may be used for GUI height selection. The GUI height function menu may be presented as a pull-down menu. The GUI height function icons may be presented in a toolbar or adjacent to the lens 410 when the lens is selected. Individual GUI height menu items or GUI height function icons may be provided for predetermined GUI heights. In this alternative, after the lens 410 is selected, a bounding rectangle icon 411 may be displayed surrounding the base 412 and a bounding rectangle icon 421 may be displayed surrounding the focal region 420. GUI height adjustment functionality is accomplished by the user selecting a GUI height from the GUI height function menu or via the GUI height function icons using a point and click operation. In this way, a GUI height function may be selected without considering the position of the cursor 401 within the lens 410.

Eye Separation. Eye separation 501 may be predetermined or user selected. The predetermined or default eye separation 501 may be set by the software to provide a parallax level, for example, of one half inch (i.e. when the display screen is viewed from a distance of 1.5 feet).

User adjustment of the eye separation 501 for the lens 410 is provided by the eye separation lens control element of the GUI. After the lens 410 is selected, the eye separation control element is presented to the user as a slide bar icon (not shown) near or adjacent to the lens 410 and typically to one side of the lens 410. Sliding the bar (not shown) of the slide bar results in a proportional change in the eye separation of the lens 410. The slide bar not only informs the user that the eye separation may be selected, but also provides the user with an indication as to what level of eye separation control is possible. The slide bar includes a bar that may be slid up and down, or left and right, to adjust and indicate the eye separation. To adjust the eye separation for the lens, the user would click on the bar of the slide bar and drag in the direction of desired eye separation. Once the desired eye separation is reached, the user would release the mouse button 310. The lens 410 is then locked with the selected eye separation until a further eye separation operation is performed.

Alternatively, rather than using a slide bar icon to implement the eye separation function, an eye separation function menu with multiple items (not shown) or multiple eye separation function icons (not shown) may be used for eye separation selection. The eye separation function menu may be presented as a pull-down menu. The eye separation function icons may be presented in a toolbar or adjacent to the lens 410 when the lens is selected. Individual eye separation menu items or eye separation function icons may be provided for predetermined eye separations. In this alternative, after the lens 410 is selected, a bounding rectangle icon 411 may be displayed surrounding the base 412 and a bounding rectangle icon 421 may be displayed surrounding the focal region 420. Eye separation adjustment functionality is accomplished by the user selecting an eye separation from the eye separation function menu or via the eye separation function icons using a point and click operation. In this way, an eye separation function may be selected without considering the position of the cursor 401 within the lens 410.

Image ZPS. In general, varying the horizontal offset of the images on the mesh used to produce a stereoscopic lens varies the ZPS of the images. The image ZPS may be predetermined or user selected. Adjusting the image ZPS is important for images that have a wide parallax range. In general, the predetermined or default image ZPS may be set by the software to correspond to a parallax level lying in the middle of the parallax range for the image.

User adjustment of the image ZPS for the lens 410 is provided by the image ZPS lens control element of the GUI. After the lens 410 is selected, the image ZPS control element is presented to the user as a slide bar icon (not shown) near or adjacent to the lens 410 and typically to one side of the lens 410. Sliding the bar (not shown) of the slide bar results in a proportional change in the image ZPS of the lens 410. The slide bar not only informs the user that the image ZPS may be selected, but also provides the user with an indication as to what level of image ZPS control is possible. The slide bar includes a bar that may be slid up and down, or left and right, to adjust and indicate the image ZPS. To adjust the image ZPS for the lens, the user would click on the bar of the slide bar and drag in the direction of desired image ZPS. Once the desired image ZPS is reached, the user would release the mouse button 310. The lens 410 is then locked with the selected image ZPS until a further image ZPS operation is performed.

Alternatively, rather than using a slide bar icon to implement the image ZPS function, an image ZPS function menu with multiple items (not shown) or multiple image ZPS function icons (not shown) may be used for image ZPS selection. The image ZPS function menu may be presented as a pull-down menu. The image ZPS function icons may be presented in a toolbar or adjacent to the lens 410 when the lens is selected. Individual image ZPS menu items or image ZPS function icons may be provided for predetermined image ZPSs. In this alternative, after the lens 410 is selected, a bounding rectangle icon 411 may be displayed surrounding the base 412 and a bounding rectangle icon 421 may be displayed surrounding the focal region 420. Image ZPS adjustment functionality is accomplished by the user selecting an image ZPS from the image ZPS function menu or via the image ZPS function icons using a point and click operation. In this way, an image ZPS function may be selected without considering the position of the cursor 401 within the lens 410.

Mesh ZPS. In general, varying the horizontal offset of the mesh, varies the ZPS of the mesh. Because the images are texture-mapped onto the mesh to produce a stereoscopic lens, when the ZPS of the mesh is changed, the ZPS of the stereoscopic image stays constant in relation to it. That is, even if the mesh is moved into the display screen, objects that originally appeared to be above the mesh will still appear to be above the mesh. Varying the ZPS of the mesh can be used as an alternative to adjusting the eye separation when the parallax for the lens is uncomfortably large. The mesh ZPS may be predetermined or user selected. For example, the predetermined or default mesh ZPS may be set by the software to correspond to a parallax level lying in the middle of the parallax range for the mesh.

User adjustment of the mesh ZPS for the lens 410 is provided by the mesh ZPS lens control element of the GUI. After the lens 410 is selected, the mesh ZPS control element is presented to the user as a slide bar icon (not shown) near or adjacent to the lens 410 and typically to one side of the lens 410. Sliding the bar (not shown) of the slide bar results in a proportional change in the mesh ZPS of the lens 410. The slide bar not only informs the user that the mesh ZPS may be selected, but also provides the user with an indication as to what level of mesh ZPS control is possible. The slide bar includes a bar that may be slid up and down, or left and right, to adjust and indicate the mesh ZPS. To adjust the mesh ZPS for the lens, the user would click on the bar of the slide bar and drag in the direction of desired mesh ZPS. Once the desired mesh ZPS is reached, the user would release the mouse button 310. The lens 410 is then locked with the selected mesh ZPS until a further mesh ZPS operation is performed.

Alternatively, rather than using a slide bar icon to implement the mesh ZPS function, a mesh ZPS function menu with multiple items (not shown) or multiple mesh ZPS function icons (not shown) may be used for mesh ZPS selection. The mesh ZPS function menu may be presented as a pull-down menu. The mesh ZPS function icons may be presented in a toolbar or adjacent to the lens 410 when the lens is selected. Individual mesh ZPS menu items or mesh ZPS function icons may be provided for predetermined mesh ZPSs. In this alternative, after the lens 410 is selected, a bounding rectangle icon 411 may be displayed surrounding the base 412 and a bounding rectangle icon 421 may be displayed surrounding the focal region 420. Mesh ZPS adjustment functionality is accomplished by the user selecting a mesh ZPS from the mesh ZPS function menu or via the mesh ZPS function icons using a point and click operation. In this way, a mesh ZPS function may be selected without considering the position of the cursor 401 within the lens 410.

In addition, the GUI 400 maintains a record of GUI height, eye separation image ZPS, and mesh ZPS operations such that the user may restore pre-GUI height, eye separation, image ZPS, and mesh ZPS operation presentations. This record of operations may be accessed by or presented to the user through "Undo" and "Redo" icons 497, 498 or a pull-down operation history menu (not shown).

Figure 6:
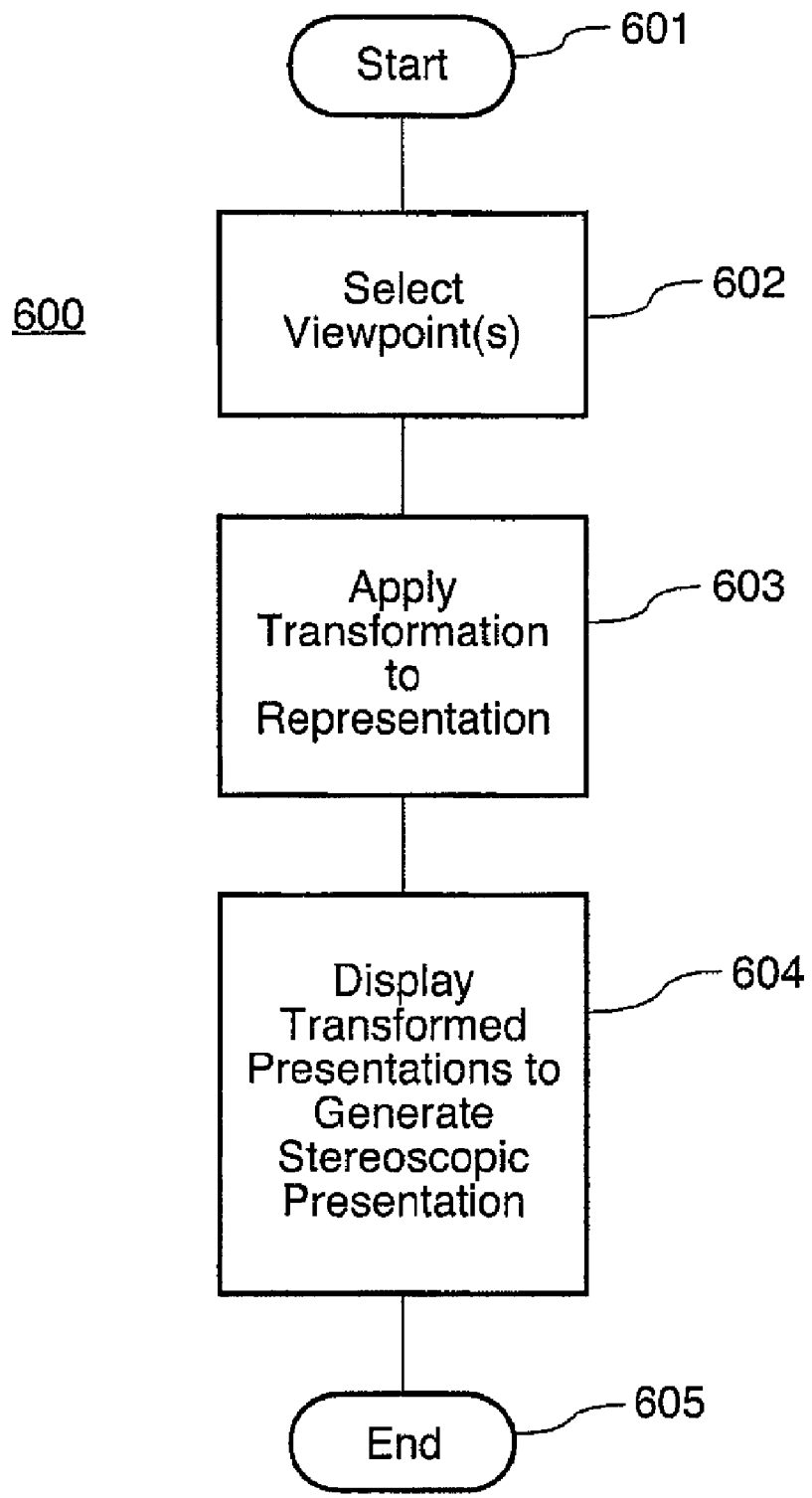

Method. FIG. 6 is a flow chart 600 illustrating a general method for generating a stereoscopic presentation of a region-of-interest in a monoscopic information representation in accordance with an embodiment. At step 601, the method starts. At step 602, first and second viewpoints for the region-of-interest are selected. At step 603, a transformation is applied to the representation to improve the visual detail in the region-of-interest by: creating a lens surface having a predetermined lens surface shape for the region-of-interest, wherein the lens surface is comprised of a plurality of polygonal surfaces constructed from a plurality of points sampled from the lens surface shape; and, creating first and second transformed presentations by overlaying the representation on the lens surface and perspectively projecting the lens surface with the overlaid representation onto a plane from the first and second viewpoints, respectively. At step 604, the first and second transformed presentations are displayed on a display screen, thereby generating the stereoscopic presentation. At step 605, the method ends.

Applications. In general, stereo lenses can be used in any application that uses non-stereo lenses. If stereo hardware is available, it can be more intuitive for a user to work with stereo lenses even on mono images. Of course, applications that already use stereoscopic image pairs will directly benefit from the described techniques. Consider applications involving stereo satellite images. Viewing these images with the aid of stereo lens is particularly beneficial because these images are based on mainly planar data having small depth differences. Stereo lenses may be used in any EPS based application which range from marketing to training. In general, stereo lenses provide benefits in navigating or enhancing computer-generated 3D spaces or worlds.

Stereoscopic presentations generated in accordance with the described techniques may be combined with detail-in-context inversion techniques, as described in U.S. patent application Ser. No. 09/932,088 and Canadian Patent Application No. 2,386,702, filed by the present applicant, and incorporated herein by reference, to perform vector data collection or vector data conversion from stereoscopic data sets including raster imagery stereo pairs from remote sensing data sources.

Similarly, stereoscopic presentations generated in accordance with the described techniques may be combined with these detail-in-context inversion techniques to perform data editing or annotation on presented data.

Data Carrier Product. The sequences of instructions which when executed cause the method described herein to be performed by the exemplary data processing system of FIG. 3 can be contained in a data carrier product according to one embodiment. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment. This integrated circuit product can be installed in the exemplary data processing system of FIG. 3.

Although various techniques for stereoscopic presentations have been described herein, it will be understood by those skilled in the art that variations may be made thereto without departing from the spirit and the scope of the described techniques for stereoscopic presentations.

What is claimed is:

1. A method implemented by a data processing system comprising:
using one or more devices of the data processing system to perform acts including:
generating a stereoscopic presentation of a region within an information representation of a digital image, the stereoscopic presentation including a stereoscopic distortion of the digital image in the region surrounded by undistorted portions of the digital image outside of the region by:
texture-mapping the information representation onto a lens constructed for the region to form three dimensional (3D) displaced points, wherein the lens includes a focal region having a first height and a plurality of polygonal surfaces forming a single distorted surface,
perspectively projecting the displaced points using a first viewing volume to produce a first image,
perspectively projecting the displaced points using a second viewing volume to produce a second image, and
interlacing the first image and the second image to produce the stereoscopic presentation; and
including, in the stereoscopic presentation, a graphical user interface ("GUI") including at least one lens control icon at a second height, wherein the GUI is configured to allow control of the focal region of the lens,
wherein the first height is not zero and wherein the second height is not zero.

2. The method as recited in claim 1, wherein the information representation comprises a monoscopic image.

3. The method of claim 1, further comprising outputting the stereoscopic presentation of the region for display by at least one display configured to produce at least one three dimensional (3D) effect when viewed using a stereoscopic viewing device.

4. A method for generating a stereoscopic presentation, the method comprising:
generating, with a data processing system, a three dimensional (3D) mesh;
texture-mapping a first image of a stereoscopic pair of images onto the 3D mesh to generate a first lensed image;
perspectively projecting the first lensed image with a perspective viewing volume to form a first perspectively projected image;
texture-mapping a second image of the stereoscopic pair of images onto the 3D mesh to generate a second lensed image;
perspectively projecting the second lensed image with the perspective viewing volume to form a second perspectively projected image; and
including, in the stereoscopic presentation, a graphical user interface ("GUI") including at least one lens control icon at a height, wherein the GUI is configured to allow control of a height of the first lensed image and a height of the second lensed image,
wherein the heights of the first lensed image, the second lensed image, and the at least one lens control icon are not zero.

5. The method of claim 4, further comprising interlacing the first perspectively projected image and the second perspectively projected image to form interlaced images.

6. The method of claim 5, further comprising displaying the interlaced images.

7. The method of claim 6, wherein the interlaced images are displayed as an anaglyph.

8. The method of claim 4, further comprising adjusting an eye separation between the first image and the second image of the stereoscopic pair of images.

9. The method of claim 8, wherein the eye separation is adjusted according to the maximum parallax in the stereoscopic pair of images.

10. The method of claim 8, wherein the eye separation is adjusted according to the average parallax in the stereoscopic pair of images.

11. The method of claim 8, further comprising adjusting the eye separation through the GUI.

12. A method for generating a stereoscopic presentation, the method comprising:
　generating, with a data processing system, a three dimensional ("3D") mesh;
　texture-mapping a first image of a stereoscopic pair of images onto the 3D mesh to generate a first lensed image;
　perspectively projecting the first lensed image with a first perspective viewing volume to form a first perspectively projected image;
　texture-mapping a second image of the stereoscopic pair of images onto the 3D mesh to generate a second lensed image;
　perspectively projecting the second lensed image with a second perspective viewing volume to form a second perspectively projected image; and
　including, in the stereoscopic presentation, a graphical user interface ("GUI") including at least one lens control icon at a height, wherein the GUI is configured to allow control of a height of the first lensed image and a height of the second lensed image,
　wherein the heights of the first lensed image, the second lensed image, and the at least one lens control icon are not zero.

13. The method of claim 12, further comprising interlacing the first perspectively projected image and the second perspectively projected image to form interlaced images.

14. The method of claim 13, further comprising displaying the interlaced images.

15. The method of claim 12, wherein the stereoscopic pair of images comprises an image zero parallax setting ("ZPS"); and
　wherein the first and the second perspectively projected images comprise a mesh ZPS.

16. The method of claim 15, further comprising adjusting an eye separation between the first image and the second image of the stereoscopic pair of images through the GUI.

17. The method of claim 15, further comprising adjusting the image ZPS and the mesh ZPS through the GUI.

18. The method of claim 1, wherein the first height and the second height are the same.

* * * * *